United States Patent
Stager

(10) Patent No.: US 11,105,362 B2
(45) Date of Patent: Aug. 31, 2021

(54) ANTI-BURR THREADED FASTENER

(71) Applicant: Triangle Fastener Corporation, Pittsburgh, PA (US)

(72) Inventor: Joseph Edward Stager, Vermilion, OH (US)

(73) Assignee: Triangle Fastener Corporation, Pittsburgh, PA (US)

(*) Notice: Subject to any disclaimer, the term of this patent is extended or adjusted under 35 U.S.C. 154(b) by 277 days.

(21) Appl. No.: 16/211,307

(22) Filed: Dec. 6, 2018

(65) Prior Publication Data
US 2019/0219090 A1    Jul. 18, 2019

Related U.S. Application Data

(60) Provisional application No. 62/616,708, filed on Jan. 12, 2018.

(51) Int. Cl.
*F16B 25/00* (2006.01)
*F16B 25/10* (2006.01)
*F16B 43/00* (2006.01)

(52) U.S. Cl.
CPC ...... *F16B 25/0057* (2013.01); *F16B 25/0047* (2013.01); *F16B 25/0068* (2013.01); *F16B 25/0073* (2013.01); *F16B 25/106* (2013.01); *F16B 25/0031* (2013.01); *F16B 25/0052* (2013.01); *F16B 43/001* (2013.01)

(58) Field of Classification Search
CPC .............. F16B 25/0057; F16B 25/0068; F16B 25/0047
USPC ........................................................ 411/386
See application file for complete search history.

(56) References Cited

U.S. PATENT DOCUMENTS

| | | | | |
|---|---|---|---|---|
| 2,242,758 A | * | 5/1941 | Ruggieri | F16B 25/0073 411/414 |
| 3,643,543 A | * | 2/1972 | Gutshall | F16B 25/0047 411/418 |
| 5,570,983 A | * | 11/1996 | Hollander | F16B 25/0015 411/308 |
| 5,827,030 A | * | 10/1998 | Dicke | F16B 25/0015 411/387.4 |
| 6,702,537 B2 | | 3/2004 | Neuhengen | |
| 6,854,942 B1 | | 2/2005 | Hargis | |
| 6,926,484 B2 | * | 8/2005 | Kram | F16B 25/0031 411/311 |

(Continued)

FOREIGN PATENT DOCUMENTS

| | | |
|---|---|---|
| WO | 9722811 A1 | 6/1997 |
| WO | 2010084469 A1 | 7/2010 |

*Primary Examiner* — Gary W Estremsky
(74) *Attorney, Agent, or Firm* — The Webb Law Firm

(57) ABSTRACT

A threaded fastener includes an elongated body having a first end and a second end, a first portion comprising a first helical thread, with the first helical thread including a crest, a root, and flank portions, and a second, tapered portion including a second helical thread. The second helical thread includes a crest, a root, a leading flank portion, and trailing flank portion, with the leading flank portion positioned closer to the second end of the elongated body than the trailing flank portion. A thread angle of the second helical thread is larger than a thread angle of the first helical thread, and the root of the second helical thread includes a root apex formed by the intersection of the trailing flank portion and the leading flank portion.

15 Claims, 4 Drawing Sheets

(56) References Cited

U.S. PATENT DOCUMENTS

| | | | |
|---|---|---|---|
| 7,682,118 B2 * | 3/2010 | Gong | F16B 25/0047 411/387.1 |
| 7,963,732 B2 | 6/2011 | Stager et al. | |
| 8,348,571 B2 * | 1/2013 | Shih | F16B 25/103 411/386 |
| 8,360,701 B2 | 1/2013 | Stager et al. | |
| 8,845,253 B2 | 9/2014 | Stager et al. | |
| 8,904,622 B2 * | 12/2014 | Kochheiser | F16B 25/0084 29/525.11 |
| 9,506,490 B2 | 11/2016 | Scheerer | |
| 10,247,220 B2 * | 4/2019 | Lehtola | F16B 25/0031 |
| 2006/0140741 A1 | 6/2006 | Lin | |
| 2008/0031705 A1 * | 2/2008 | Severns | F16B 35/065 411/413 |
| 2014/0090233 A1 | 4/2014 | Kochheiser et al. | |
| 2015/0052735 A1 * | 2/2015 | Kochheiser | F16B 25/0084 29/525.11 |
| 2016/0208842 A1 * | 7/2016 | Lin | F16B 25/0057 |
| 2016/0238054 A1 | 8/2016 | Lehtola | |

* cited by examiner

ANTI-BURR THREADED FASTENER

CROSS-REFERENCE TO RELATED APPLICATION

This application claims priority to U.S. Provisional Application No. 62/616,708, filed Jan. 12, 2018, which is hereby incorporated by reference in its entirety.

BACKGROUND OF THE INVENTION

Field of the Invention

This invention relates to fasteners, and, more particularly, to threaded fasteners having an anti-burr feature for preventing the formation of burrs during installation of the fastener.

Description of Related Art

In the construction industry, painted or coated metal roofing, siding, and trim materials are typically attached to various wooden substrates using various types of wood screws. These screws most often having a self-piercing gimlet point that penetrates the steel without pre-drilling. The steel is typically 20 ga (0.036") thick maximum with a thickness of 24 ga (0.024") typical. The screws are most often assembled with a steel bonded rubber sealing washer that compresses under the head of the screw when seated against the steel material. The function of the steel bonded rubber sealing washer is to keep moisture from penetrating under the head of the screw and down the threads. The washer also provides a large bearing surface that increases the amount of pullover force required from the panel to be pulled over the screw head.

One problem associated with these types of screws relates to the self-piercing point, which causes a burr or swarf as it penetrates the steel. This swarf causes many problems. The burr or swarf often times extends beyond the sealing washer after the screw is installed. This exposed swarf will rust quickly when exposed to the weather and stain the steel panel. Another problem is that the swarf can damage the rubber sealing washer during compression, which can cause leaks in the roof panel or siding. Yet another problem is if the swarf breaks away during screw installation and rests on the panel, which also may cause corrosion.

Furthermore, another problem with existing wood screw designs is the tendency for the screw to back-out over time thereby weakening the connection and the structural integrity of the building and possibly causing leaks.

SUMMARY OF THE INVENTION

In one embodiment, a threaded fastener includes an elongated body having a first end and a second end, a first portion comprising a first helical thread, with the first helical thread including a crest, a root, and flank portions, and a second, tapered portion including a second helical thread. The second helical thread includes a crest, a root, a leading flank portion, and trailing flank portion, with the leading flank portion positioned closer to the second end of the elongated body than the trailing flank portion. A thread angle of the second helical thread is larger than a thread angle of the first helical thread, and the root of the second helical thread includes a root apex formed by the intersection of the trailing flank portion and the leading flank portion.

A flank angle of the leading flank portion of the second helical thread may be larger than a flank angle of the trailing flank portion of the second helical thread. The thread angle of the second helical thread may be 65-87 degrees. The thread angle of the first helical thread may be 60 degrees. The flank angle of the leading flank portion of the second helical thread may be 57-65 degrees. The second, tapered portion may have an angle of 20-26 degrees. The second, tapered portion may have a self-piercing tip. The second helical thread may be a double lead thread and may have a pitch of 0.031-0.050 inches. The first helical thread may be a single lead thread and have a pitch of 0.040-0.083 inches.

The fastener may further include a third portion positioned between the first and second portions, with the third portion including a third helical thread that includes a serrated thread form.

The fastener may include a head portion positioned at the first end of the elongated body, with the head portion including a drive face.

In a further aspect, a threaded fastener includes an elongated body having a first end and a second end, a first portion including a first helical thread, with the first helical thread having a single lead with a crest, a root, and flank portions, and a pitch of 0.040-0.083 inches, and a second, tapered portion including a second helical thread, with the second helical thread having double lead with a crest, a root, a leading flank portion, and trailing flank portion. The leading flank portion is positioned closer to the second end of the elongated body than the trailing flank portion. The second helical thread has a pitch of 0.031-0.050 inches, with a flank angle of the leading flank portion of the second helical thread being larger than a flank angle of the trailing flank portion of the second helical thread.

A thread angle of the second helical thread may be larger than a thread angle of the first helical thread. The root of the second helical thread may include a root apex formed by the intersection of the trailing flank portion and the leading flank portion. The thread angle of the second helical thread may be 65-87 degrees. The thread angle of the first helical thread may be 60 degrees. The flank angle of the leading flank portion of the second helical thread may be 57-65 degrees. The second, tapered portion may have an angle of 20-26 degrees.

In a further aspect, a threaded fastener includes an elongated body having a first end and a second end, a first portion including a first helical thread, with the first helical thread having a single lead with a crest, a root, and flank portions and a pitch of 0.040-0.083 inches and a thread angle of 60 degrees, and a second, tapered portion including a second helical thread, with the second helical thread having double lead with a crest, a root, a leading flank portion, and trailing flank portion. The leading flank portion is positioned closer to the second end of the elongated body than the trailing flank portion, the second helical thread has a pitch of 0.031-0.050 inches and a thread angle of 65-87 degrees, and a flank angle of the leading flank portion of the second helical thread is larger than a flank angle of the trailing flank portion of the second helical thread. The root of the second helical thread includes a root apex formed by the intersection of the trailing flank portion and the leading flank portion.

The flank angle of the leading flank portion of the second helical thread may be 57-65 degrees. The second, tapered portion may have an angle of 20-26 degrees.

DETAILED DESCRIPTION

Figure 1:
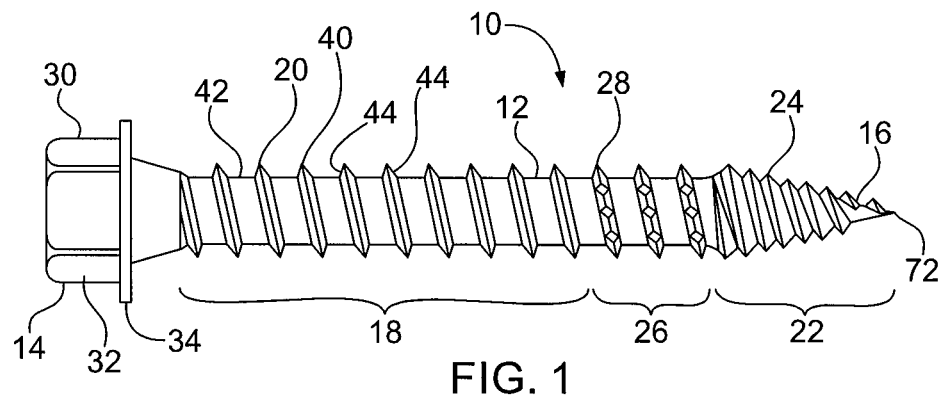
FIG. 1 is a side view of a threaded fastener according to one aspect of the present invention.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific fasteners illustrated in the accompanying drawing figures and described herein are simply exemplary and should not be considered as limiting.

Referring to FIGS. 1-7, a threaded fastener 10 according to one aspect of the present invention includes an elongated body 12 having a first end 14 and a second end 16, a first portion 18 comprising a first helical thread 20, a second, tapered portion 22 comprising a second helical thread 24, and a third portion 26 comprising a third helical thread 28. The third portion 26 is positioned between the first portion 18 and the second portion 22. The threaded fastener 10 also includes a head portion 30 positioned at the first end 14 of the elongated body 12. The head portion 30 includes a drive face 32 configured to be engaged by a drive tool to install the threaded fastener 10 and a flange 34. The first portion 18 is positioned between the head portion 30 and the third portion 26. The second portion 22 is positioned at the second end 16 of the elongated body 12 and adjacent to the third portion 26. The head portion 30 may be a hex washer head, a pan head, a pancake head, a zinc cap head, or a stainless steel cap head, although other suitable head arrangements may be utilized.

Referring to FIG. 1, the first helical thread 20 is a single lead thread which includes a crest 40, a root 42, and flank portions 44. The first helical thread 20 includes a thread angle of 60 degrees and a pitch of 0.040-0.083 inches, although other suitable thread angles and pitches may be utilized. In one aspect, the first helical thread 20 is positioned on at least half the length of the elongated body 12. The root 42 of the first helical thread 20 is flat in contour. In other words, the root 42 is a cylindrical between the adjacent flank portions 44. In an axial cross-section of the fastener, the root 42 defines a linear plane extending between the adjacent flank portions 44. In one aspect, the first helical thread 20 is a #10-12 single lead thread with a major diameter of 0.183-0.194 inches and a minor diameter of 0.122-0.134 inches in accordance with standard ASME B18.6.1, although other suitable thread configurations may be utilized.

Referring to FIGS. 1-7, the second helical thread 24 begins at the second, tapered portion 22, i.e., where the non-tapered portion (first and third portions 18, 26) of the threaded fastener 10 intersects with the second, tapered portion 22. The second helical thread 24 is a double lead thread that includes a crest 60, a root 62, a leading flank portion 64, and a trailing flank portion 66. The leading flank portion 64 is positioned closer to the second end 16 of the elongated body 12 than the trailing flank portion 66. A thread angle A1,A2 of the second helical thread 24 is larger than the thread angle of the first helical thread 20. As shown more clearly in FIGS. 3-7, the root 62 of the second helical thread 24 includes a root apex 70 formed by the intersection of the trailing flank portion 66 and the leading flank portion 64. Thus, the leading flank portion 64 and the trailing flank portion 66 intersect to form a sharp root. From a practical standpoint and due to manufacturing tolerances, the root 62 will have one or more radiused portions. In particular, if the threaded fastener 10 is manufactured by a roll forming process, the root 62 will typically include two radii that are tangential to the leading flank portion 64 and the trailing flank portion 66 to form a continuous, smooth blended curve from the leading flank portion 64 to the trailing flank portion 66.

Figure 2:
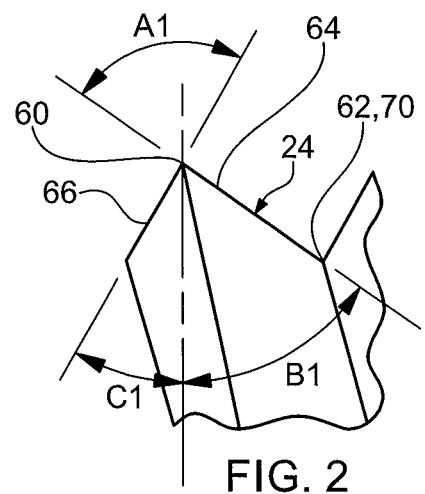
FIG. 2 is a schematic view of a thread form at a tapered portion of the threaded fastener of FIG. 1.
Figure 3:
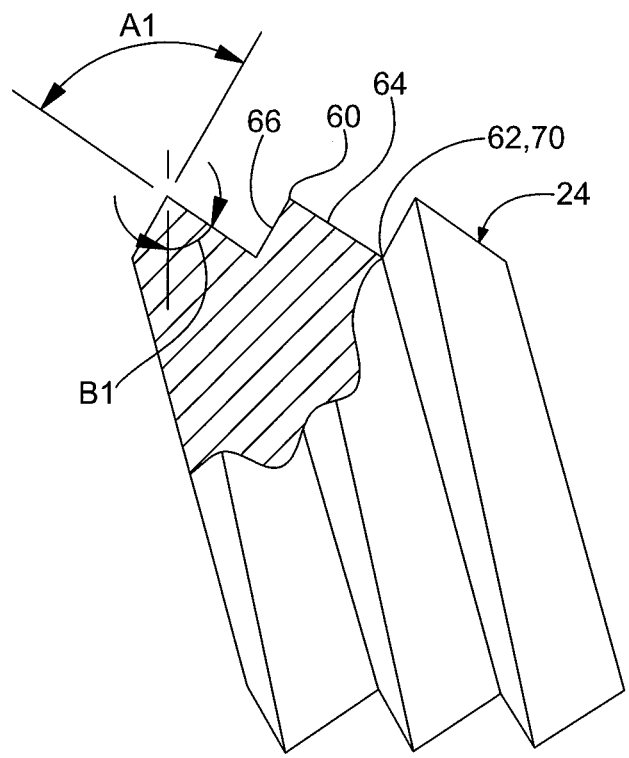
FIG. 3 is a partial cross-sectional view of a thread form according to one aspect of the present invention.
Figure 4:
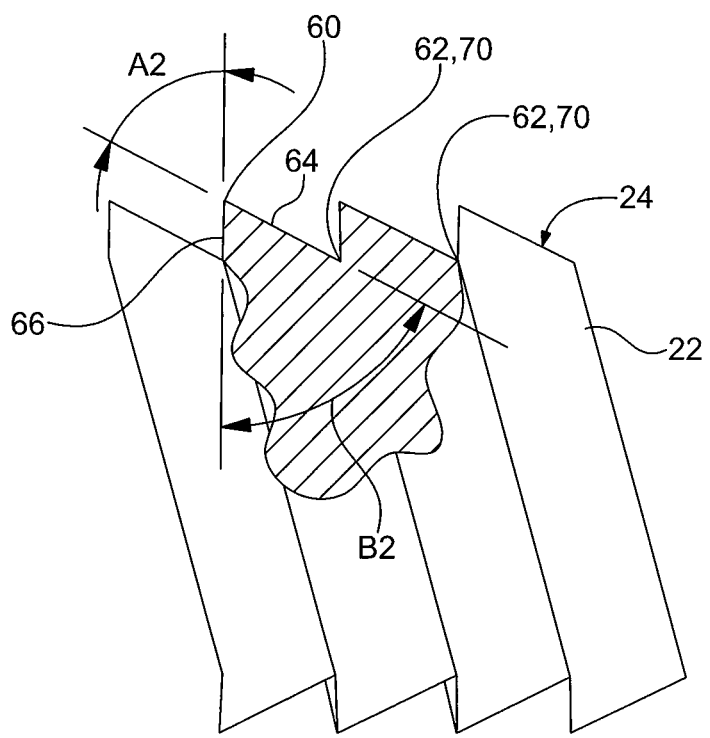
FIG. 4 is a partial cross-sectional view of a thread form according to a further aspect of the present invention.
Figure 5:
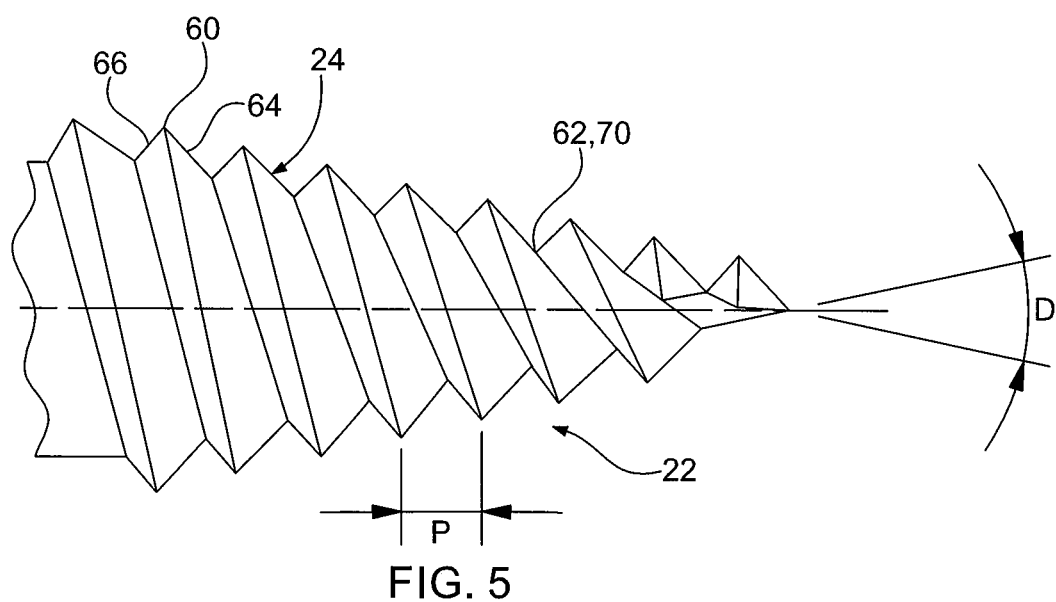
FIG. 5 is a partial side view of a tapered portion of the threaded fastener of FIG. 1.
Figure 6:
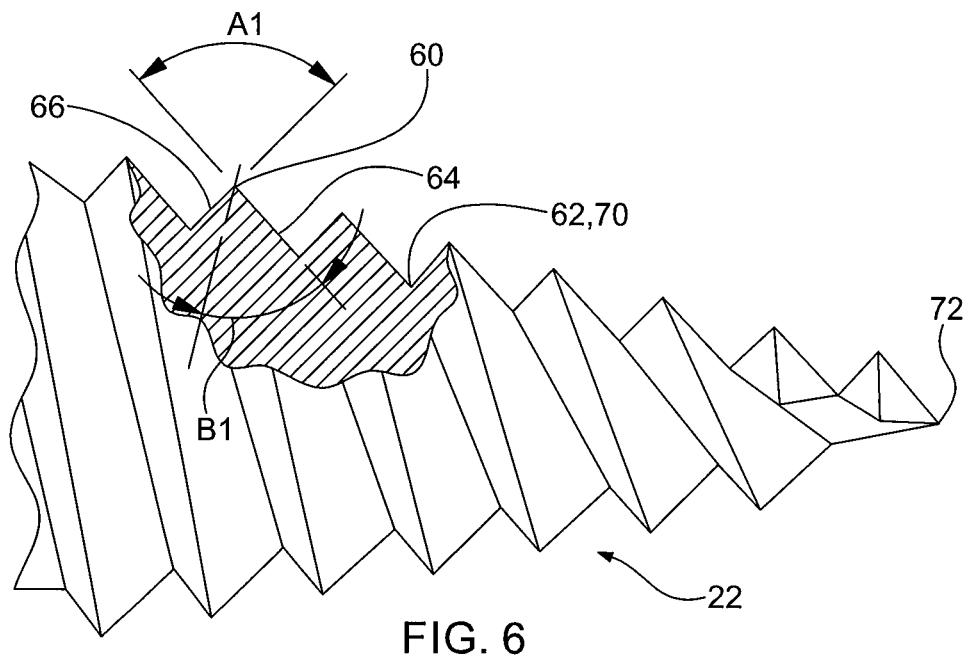
FIG. 6 is a partial cross-sectional view of a tapered portion of the threaded fastener of FIG. 1.
Figure 7:
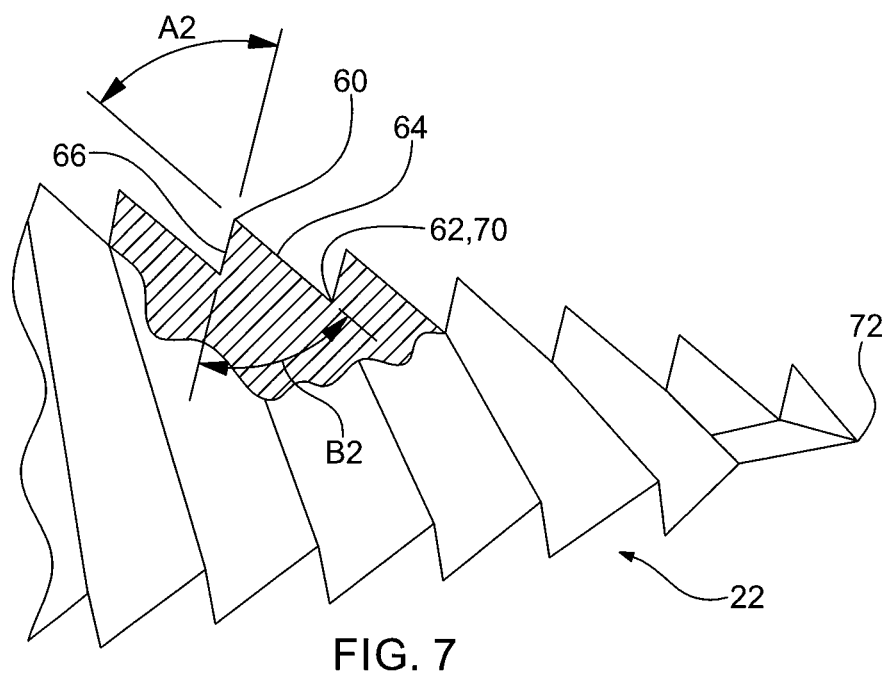
FIG. 7 is a partial cross-sectional view of a tapered portion of a threaded fastener according to a further aspect of the present invention.

Referring again to FIGS. 1-7, a flank angle B1,B2 of the leading flank portion 64 of the second helical thread 24 is larger than a flank angle C1 of the trailing flank portion 66 of the second helical thread 24. The flank angle B1,B2 of the leading flank portion 64 of the second helical thread 24 is 57-65 degrees. The thread angle A1,A2 of the second helical thread 24 is 65-87 degrees. As shown in FIGS. 2, 3, and 6, in one aspect, the thread angle A1 of the second helical thread 24 is 87 degrees, the flank angle B1 of the leading flank portion 64 is 57 degrees, and the flank angle C1 of the trailing flank portion 66 is 30 degrees. As shown in FIGS. 4 and 7, in a further aspect, the thread angle A2 of the second helical thread 24 is 65 degrees, the flank angle B2 of the leading flank portion 64 is 65 degrees, and the flank angle of the trailing flank portion is 0 degrees. The second helical thread 24 has a pitch P of 0.031-0.050 inches. In one aspect, the second helical thread 24 is a #10-24 double lead thread. The thread angle A1,A2 range of the second helical thread of 65-87 degrees, the flank angle B1,B2 range of the leading flank portion of the second helical thread 24 of 57-65 degrees, and the pitch P range of 0.031-0.050 inches are each important for ensuring that the second helical thread 24 extrudes the steel as the second, tapered portion 22 pierces the steel thereby reducing the likelihood of the formation of burrs. These ranges also ensure that the leading flank portion 64 and the trailing flank portion 66 form the root apex 70 discussed above, which also contributes to the reduction in the formation of burrs or swarfs.

Referring to FIGS. 1 and 5-7, the second, tapered portion 22 has an angle D of 20-26 degrees. In one aspect, the angle D of the second, tapered portion is 25 degrees. The angle D of the second, tapered portion 22 also contributes to the reduction in the formation of burrs. The second end 16 of the elongated body 12 at the second, tapered portion 22 includes a self-piercing point 72 that is configured to pierce metal and wood to allow the threaded fastener 10 to be installed without pre-drilling the metal or wood.

Referring to FIG. 1, the third helical thread 28 of the third portion 26 includes a serrated thread form. The third helical thread 28 may be configured to reduce the tapping torque in wood and minimize wood splitting during installation of the threaded fastener 10 into wood. The third helical thread 28 is the same pitch, major diameter, and minor diameter of the first helical thread 20, although other suitable configurations may be utilized for the third helical thread 28. The third helical thread 28 may be a SPAX® thread form or suitable equivalent, although other thread forms may also be utilized.

Although not shown, the threaded fastener 10 may be utilized with a steel bonded rubber sealing washer, which abuts the flange 34 of the head portion 30 during installation of the threaded fastener 10. The sealing washer may be a'/2 inch OD G90 galvanized washer, which is vulcanized to black non-conductive EPDM rubber, although other suitable washer configurations may be utilized.

The threaded fastener 10 may be provided in a number of different sizes, including #8, #10, #12, and #14, although the threaded fastener 10 may also be provided in other suitable sizes. The threaded fastener 10 may be formed from carbon steel, stainless steel, or aluminum, although other suitable materials and combination of materials may be utilized.

While certain embodiments of the threaded fastener were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A threaded fastener comprising:
   an elongated body having a first end and a second end;
   a first portion comprising a first helical thread, the first helical thread comprising a crest, a root, and flank portions, the root of the first helical thread is cylindrical between the flank portions of the first helical thread, the first helical thread having a first pitch; and
   a second, tapered portion comprising a self-piercing tip and a second helical thread starting at the second, tapered portion, the second, tapered portion having an angle of 20-26 degrees, the second helical thread comprising a crest, a root, a leading flank portion, and trailing flank portion, the leading flank portion positioned closer to the second end of the elongated body than the trailing flank portion, the second helical thread having a second pitch, wherein the first pitch is different than the second pitch,
   wherein a thread angle of the second helical thread is larger than a thread angle of the first helical thread, and wherein the root of the second helical thread comprises a root apex formed by the intersection of the trailing flank portion and the leading flank portion.

2. The threaded fastener of claim 1, wherein a flank angle of the leading flank portion of the second helical thread is larger than a flank angle of the trailing flank portion of the second helical thread.

3. The threaded fastener of claim 2, wherein the thread angle of the second helical thread is 65-87 degrees.

4. The threaded fastener of claim 3, wherein the thread angle of the first helical thread is 60 degrees.

5. The threaded fastener of claim 2, wherein the flank angle of the leading flank portion of the second helical thread is 57-65 degrees.

6. The threaded fastener of claim 1, wherein the second helical thread comprises a double lead thread.

7. The threaded fastener of claim 6, wherein the second pitch of the second helical thread is 0.031-0.050 inches.

8. The threaded fastener of claim 6, wherein the first helical thread comprises a single lead thread.

9. The threaded fastener of claim 8, wherein the first pitch of the first helical thread is 0.040-0.083 inches.

10. The threaded fastener of claim 1, further comprising a third portion positioned between the first and second portions, the third portion comprising a third helical thread, the third helical thread comprising a serrated thread form.

11. The threaded fastener of claim 1, further comprising a head portion positioned at the first end of the elongated body, the head portion comprising a drive face.

12. The threaded fastener of claim 1, wherein the second helical thread ends at the second end of the elongated body.

13. A threaded fastener comprising:
    an elongated body having a first end and a second end;
    a first portion comprising a first helical thread, the first helical thread comprising a single lead with a crest, a root, and flank portions, the root of the first helical thread is cylindrical between the flank portions of the first helical thread, the first helical thread having a pitch of 0.040-0.083 inches and a thread angle of 60 degrees; and
    a second, tapered portion comprising a self-piercing tip and a second helical thread starting at the second, tapered portion, the second helical thread comprising a double lead with a crest, a root, a leading flank portion, and trailing flank portion, the leading flank portion positioned closer to the second end of the elongated body than the trailing flank portion, the second helical thread having a pitch of 0.031-0.050 inches and a thread angle of 65-87 degrees,
    wherein a flank angle of the leading flank portion of the second helical thread is larger than a flank angle of the trailing flank portion of the second helical thread, and wherein the root of the second helical thread comprises a root apex formed by the intersection of the trailing flank portion and the leading flank portion.

14. The threaded fastener of claim 13, wherein the flank angle of the leading flank portion of the second helical thread is 57-65 degrees.

15. The threaded fastener of claim 14, wherein the second, tapered portion has an angle of 20-26 degrees.

* * * * *